United States Patent [19]
Boll et al.

[11] Patent Number: 5,364,319
[45] Date of Patent: Nov. 15, 1994

[54] DRIVING METHOD AND ARRANGEMENT WITH EPICYCLIC GEARBOX HAVING A CENTRIFUGAL BRAKE AND ABS FOR MOTOR VEHICLE AXLES

[75] Inventors: Wolf Boll, Weinstadt; Axel Fedeler, Sindelfingen, both of Germany

[73] Assignee: Mercedes-Benz AG, Germany

[21] Appl. No.: 982,686

[22] Filed: Nov. 27, 1992

[30]   Foreign Application Priority Data

Nov. 26, 1991 [DE] Germany ............................ 4138738

[51] Int. Cl.[5] ........................ B60K 23/08; F16H 1/42
[52] U.S. Cl. ................................ 475/224; 475/150; 475/258
[58] Field of Search ............... 475/150, 151, 152, 198, 475/206, 221, 223, 224, 258, 260, 332, 339

[56]   References Cited
U.S. PATENT DOCUMENTS

| | | | |
|---|---|---|---|
| 2,666,492 | 1/1954 | Nims et al. | 475/150 X |
| 4,691,593 | 9/1987 | Mueller | 475/224 |
| 4,882,952 | 11/1989 | Gaurab et al. | 475/224 X |
| 4,989,686 | 2/1991 | Miller | 475/150 X |

OTHER PUBLICATIONS

Dr. -Ing. Adam Zomotor, Fahrewerktechnik: Fahrverhalten, Vogel Buchverlag Würzburg, pp. 83–97 and three additional pages.

Robert Müller and Lothar Witte, PDS-a New Driveline Concept for 4WD-Vehicles-Part 1, pp. 595–598, AZT, 1987.

Primary Examiner—Dirk Wright
Assistant Examiner—Khoi Q. Ta
Attorney, Agent, or Firm—Evenson, McKeown, Edwards & Lenahan

[57]   ABSTRACT

An arrangement with an epicyclic gearbox for driving two motor vehicle axles utilizes two inner central wheels with different numbers of teeth and engaging with a planet wheel. The inner central wheels are respectively in effective drive connection with one vehicle axle while the planet carrier of the planet wheel is connected to a centrifugal brake used as bursting protection for the epicyclic gear and a friction clutch effectively located between the planet carrier and a central wheel.

8 Claims, 3 Drawing Sheets

DRIVING METHOD AND ARRANGEMENT WITH EPICYCLIC GEARBOX HAVING A CENTRIFUGAL BRAKE AND ABS FOR MOTOR VEHICLE AXLES

BACKGROUND AND SUMMARY OF THE INVENTION

The present invention relates to a method and an arrangement comprising an epicyclic gearbox for driving two vehicle axles of a motor vehicle, in which two inner central wheels with different numbers of teeth and engaging with a planet wheel are respectively in permanent drive connection with one vehicle axle and a planet carrier of the planet wheel can be locked solid via a centrifugal brake.

In a known driving arrangement as shown, for example, in ATZ Automobiltechnische Zeitschrift 89 (1987), No. 11, p. 596, the front axle is permanently driven and the epicyclic gearbox with the centrifugal brake is used to switch the rear axle steplessly on and off exclusively as a function of the slip when slip appears.

It is necessary to provide safety with respect to the bursting of the epicyclic gearbox if the associated control electronics should fail and, consequently, high rotational speeds in the epicyclic gearbox are the result of slip occurring. An object on which the present invention is, therefore, based is to be able both to reduce the torque of a friction clutch effectively located between the two vehicle axles by way of the epicyclic gearbox and also to adjust it steplessly as a function of the slip of one vehicle axle.

Such friction clutches can be used for switching on one vehicle axle in the case of an all-wheel drive system in which the other vehicle axle is permanently driven. The referenced friction clutches are also employed for the stepless locking of an epicyclic distributor gearbox effectively located between the two vehicle axles.

The foregoing object has been achieved in an advantageous manner in accordance with the present invention in that the planet carrier is operatively connected to one of the inner central wheels by a friction clutch whose torque is controllable as a function of slip occurring at one wheel of a vehicle axle and, with an automatic lock preventer (ABS) present, a response rotational speed of the centrifugal brake is sufficiently high to avoid suppression of slip threshold values of the lock preventer (ABS).

In an embodiment according to the present invention, the planet carrier connected to the centrifugal brake is driven more rapidly on the appearance of differential rotational speed between the inner central wheels so that the clutch torque of the friction clutch is reduced. The planet carrier does not, however, enter a critical rotational speed range in which there is a danger of the epicyclic gearbox bursting in the event that the functions of the control electronics and the electromagnetic clutch setting elements do not fail, i.e. provided the rotational speed of the planet wheel carrier is limited by the friction clutch.

If, unfortunately, slip should occur on one vehicle axle after the failure of the control electronics or of the clutch setting element, the planet carrier accelerated to high rotational speeds is retarded by the centrifugal brake so that the danger of bursting is avoided.

Another advantageous aspect of the drive arrangement according to the present invention is that it has use in an all-wheel drive system with a vehicle axle which can be switched on. In such a drive arrangement, the use of an input bell housing for connecting the input shaft both with the friction clutch and with a coaxial output shaft has been found to be advantageous.

Yet another advantageous aspect of the drive arrangement according to the present invention is its use in an all-wheel drive system in which both vehicle axles are permanently driven, and the two central wheels and the input shaft driven by an engine are connected to one another by an epicylic distributor gearbox.

In one embodiment according to the invention, lightweight construction and rapid response behavior are provided to a particular degree by the use of a plate clutch and/or an electromagnetic setting element for the control of the clutch.

The use of the arrangement according to the present invention in a motor vehicle equipped with an automatic lock preventer is made possible in an advantageous manner by providing that the friction clutch is disengaged when the brakes are actuated.

An operationally reliable friction lock of a distributor gearbox or the switching on of a vehicle axle with small clutch forces is achieved in the arrangement according to the present invention because the necessary clutch torques are reduced by the epicyclic gearbox.

In the case of spin of only one vehicle axis due to drive torques which cannot be reduced or the locking of only one vehicle axis due to braking torques which cannot be reduced, high differential rotational speeds arise which could lead to the destruction of the epicyclic gearbox and clutch and which also represent a danger for the occupants of the vehicle.

In normal operation, unallowable differential rotational speeds are prevented because the drive torques and braking torques of the engine are distributed in the correct ratio to the two vehicle axles by actuation of the clutch and an anti-lock braking system limits the brake slip of each vehicle axle to an allowable maximum amount by reducing the brake pressure.

In the arrangement according to the present invention, the clutch is not constructed as a pure centrifugal clutch. This has been recognized to be disadvantageous because the threshold value for the drive slip of the engine is lower than that for the brake slip. If such a clutch were to engage in the case of a full braking operation at the same low slip value as is necessary in the drive case, the front axle, which has to run in a higher slip range for the purpose of good deceleration, would also retard the rear axle via such a clutch. This, however, reduces the important lateral guidance of the rear axle and impairs the function of the anti-lock braking system.

An essential advantage of the arrangement according to the present invention consists in the fact that the clutch is configured as an electromagnetically actuated plate clutch so that switching on can be controlled in accordance with the particular requirements and so that this clutch, together with the epicyclic gearbox, can be protected from bursting by a centrifugal brake in the event of failure of the electronics. The threshold value for the centrifugal brake is placed sufficiently high to permit full anti-lock braking without any influence thereon.

The centrifugal brake can be configured in such that there is a longitudinally slotted drum which is fastened to the planet carrier and whose straps can spring out radially under centrifugal force, come into contact with the casing and thereby retard the planet carrier via frictional connection.

An essential advantage of the invention is that anti-lock braking operations are included in the working range of the arrangement unlike known driving arrangement which does not permit anti-lock braking because in it a high differential rotational speed occurs between the front axle and the rear axle. Thus, the front axle can run in a high slip range for the purpose of good retardation values; the rear axle, in contrast, runs in a low slip range for the purpose of good lateral guidance. The centrifugal brake of the known arrangement always limits the differential rotational speed to the desired drive slip which, however, is much smaller than the brake slip necessary for anti-lock braking.

In the arrangement according to the invention, the drive working range and the brake working range are distinguished from each other. The friction clutch permits correspondingly different differential rotational speeds. The centrifugal brake of the arrangement according to the invention only represents a device to protect the epicyclic gearbox from bursting should an electronic failure occur (an anti-lock braking failure and an emergency braking action in which the front axle locks but the rear axle does not would be conceivable).

In the arrangement according to the invention, the response rotational speed of the centrifugal brake is sufficiently high for the slip threshold values of the lock preventer so as not to be suppressed.

The determination of the slip threshold value in an anti-lock braking system (ABS) as an embodiment of a lock preventer is known per se as shown in Vogel-Fachbuch Technik Kraftfahrzeugwesen, Volume Fahrwerktechnik: Fahrverhalten; Vogel Buchverlag Würzburg, 1st edition 1987, p. 94, FIG. 3.36.

BRIEF DESCRIPTION OF THE DRAWINGS

These and further objects, features and advantages of the present invention will become more readily apparent from the following detailed description of currently preferred embodiments when taken in conjunction with the accompanying drawings wherein:

FIG. 1 is a partial cross-sectional view of one embodiment of an arrangement according to the invention for an all-wheel drive of a motor vehicle with a permanently driven vehicle axle and with a vehicle axle which can be switched on;

DETAILED DESCRIPTION OF THE DRAWINGS

Figure 1:
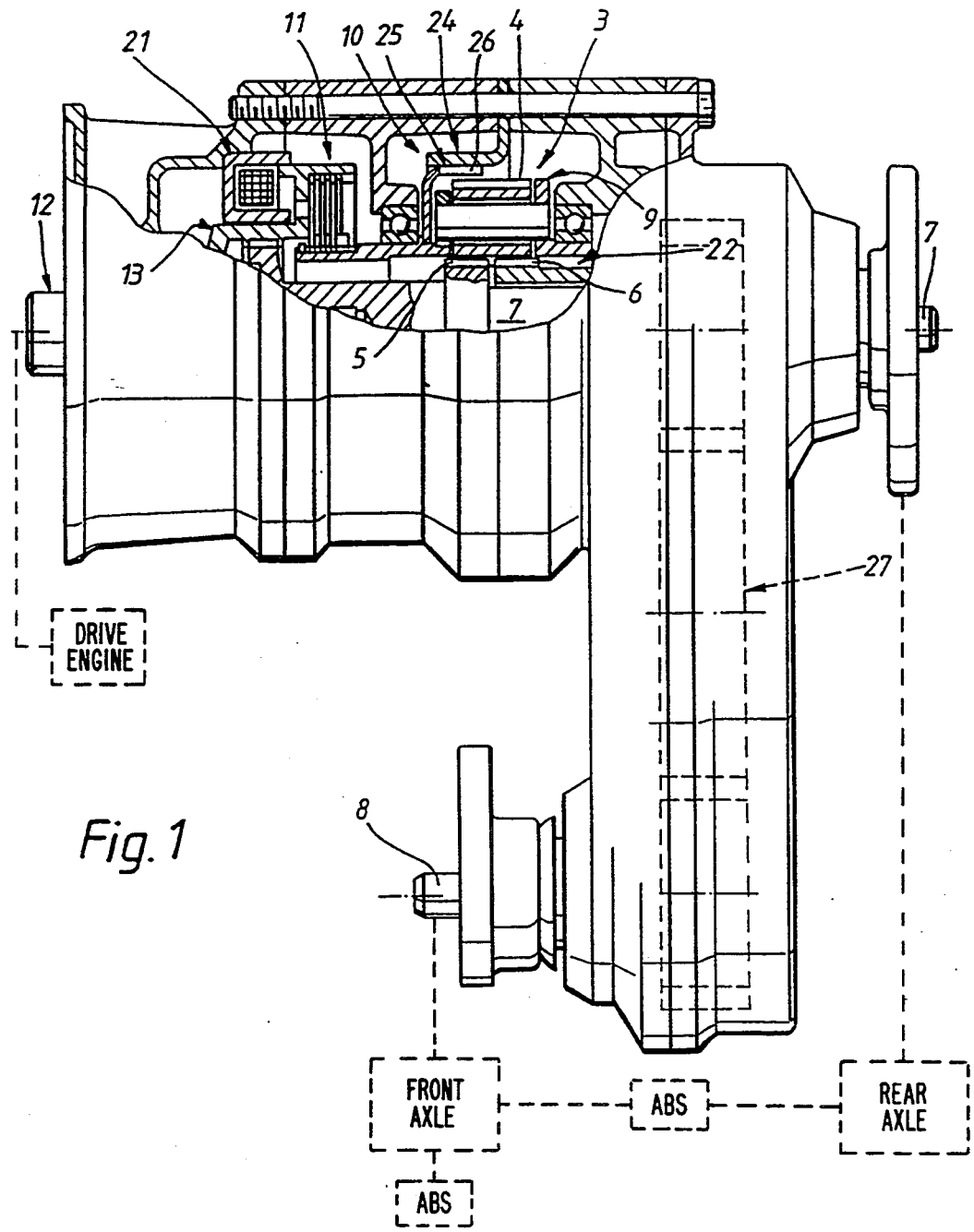
Figure 2:
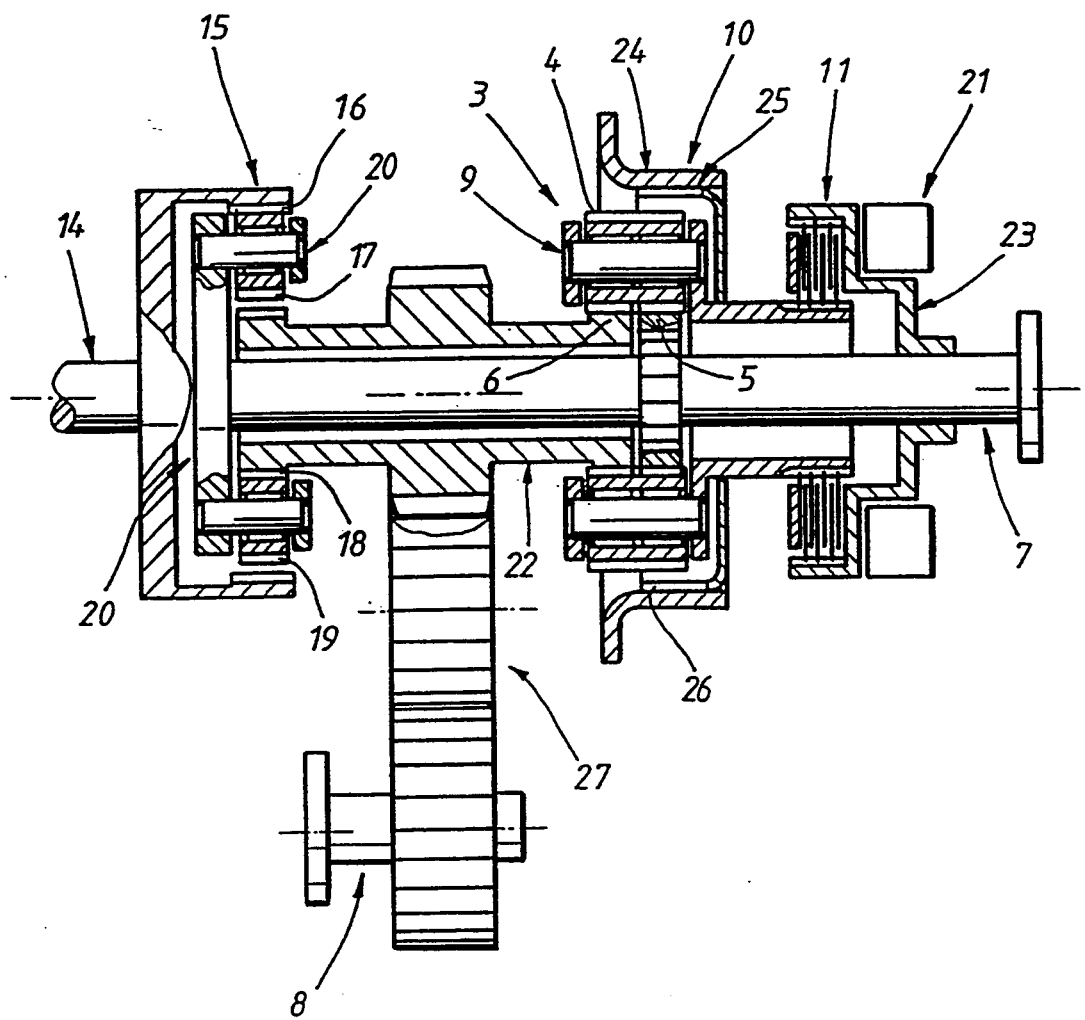
FIG. 2 is a partial cross-sectional view of a second embodiment of an arrangement according to the invention for an all-wheel drive of a motor vehicle with two permanently driven vehicle axles.

The following discussion is common to the two embodiments of FIGS. 1 and 2. An epicyclic gearbox 3 has a planet carrier 9 with at least one planet wheel 4 with which two inner central wheels 5 and 6 with different numbers of teeth engage. The central wheel 5, which has the smaller number of teeth than the central wheel 6 is arranged so that it rotates with an output shaft 7 which is in drive connection, in known manner, with the axle drive of the rear axle of the motor vehicle. The central wheel 6 is of annular configuration and rotates with a hollow shaft 22 which concentrically encloses the output shaft 7 and is in drive connection, via a wheel train 27 (shown in dashed lines), with a second output shaft 8 parallel to the first output shaft 7. The output shaft 8 is, in turn, in drive connection, in known manner, with the axle drive of the front axle.

The different numbers of teeth of the central wheels 5, 6 have the effect that in the case of a relative rotational speed of the planet wheel 4, a differential motion occurs between the central wheels. Because of its high transmission ratio relative to the strut rotational speed, this planet drive has a high level of internal friction. Where the frictional relationships permit, a stepped planet can be used instead of the simple planet.

The planet carrier 9 can be retarded by a centrifugal brake 10 and is connected by a plate clutch 11, via an input bell housing 13 (FIG. 1) or 23 (FIG. 2) to the output shaft 7 and, therefore, to the central wheel 5. The torque of the plate clutch 11 can be adjusted by way of an electromagnetic clutch setting element 21.

The centrifugal brake 10 has a stationary cylindrical brake casing 24 and a concentric cylindrical centrifugal force carrier 25 which is connected so that it rotates with the planet carrier 9. The cylindrical part of the centrifugal force carrier 25 is axially slotted so that strap-shaped centrifugal force bodies 26 are formed which make frictional contact with the brake casing 24 under the action of the centrifugal force.

In the embodiment of FIG. 1, the input bell housing 13 is connected so that it rotates with an input shaft 12 which is coaxial with the output shaft 7. This input shaft 12 therefore permanently drives the rear axle. In contrast, the front axle runs therewith without drive under normal conditions. When slip occurs at the rear axle (drive slip), the transmittable torque of the plate clutch 11 (whose clutch half connected to the planet carrier 9 is driven more rapidly relative to the input shaft 12 because of the differential rotational speed then occurring between the central wheels 5, 6) is controlled by control electronics as a function of slip and any other parameters of the driving state in its transmittable torque. The rotational speeds occurring at the planet carrier 9 are, however, still low enough for the centrifugal brake 10 not to respond. The friction clutch 11 is disengaged from the control electronics as soon as the operating brakes are actuated.

The response rotational speed of the centrifugal brake 10 is sufficiently high for the slip threshold values for the actuation of the solenoid valves not to be suppressed when the lock preventer (for example ABS) is activated.

It is only when the control electronics fail and slip occurs at the rear axle that the planet carrier 9 can be driven more rapidly to the point where the response rotational speed of the centrifugal brake 10 is exceeded and the centrifugal straps 26 come into contact with the brake drum 24 so as to avoid the danger of the gearbox 3 and the clutch 11 bursting.

The numbers of teeth of the two inner central wheels 5, 6 can be made only slightly different, using teeth with displaced profiles, so that it is possible to use continuous straight teeth for the planet wheel 4 in each case.

In the embodiment of FIG. 2, the two central wheels 5, 6 of the epicyclic gearbox 3 having the centrifugal brake 10 and used for driving the plate clutch 11 are effectively connected by an epicyclic distributor gearbox 15 to an input shaft 14 which can be driven by a driving engine via a change-speed gearbox. The distributor gearbox 15 has an outer central wheel 16 connected so that it rotates with the input shaft 14, an inner central wheel 18 connected so that it rotates with the hollow shaft 22 of the central wheel 6 and a planet carrier 20 connected so that it rotates with the output shaft 7 of the central wheel 5. Double planets, each of which consists of an outer planet 17 and an inner planet 19 which engage with one another, are located on the planet carrier 20. The outer planets 17 also engage with the outer central wheel 16 whereas the inner planets 19 also engage with the inner central wheel 18.

Under normal conditions, i.e. there is no drive slip on the two vehicle axles, the two gearboxes 3 and 15 respectively rotate as a block and the plate clutch 11 remains disengaged. If drive slip occurs on one of the two vehicle axles, the plate clutch 11 is activated by the control electronics to steplessly lock the epicyclic gear 3 and, therefore, the epicyclic gear 15 also. The centrifugal brake 10 does not respond because in this working range the rotational speeds of the planet carrier 9 are lower than the response rotational speed.

When the operating brakes are activated, the plate clutch 11 is forced to disengage, as in the embodiment of FIG. 1. Slip possibly occurring during a braking procedure does not lead to centrifugal braking in this situation either, because the response rotational speed of the brake 10 is higher than the slip threshold values of the anti-lock braking system used which lead to response of the solenoid valves.

It is only in the event of a failure of the control electronics and slip occurring at one vehicle axle that the planet carrier 9 is driven more rapidly in such a way that the centrifugal brake 10 responds and the two central wheels 5 and 6 are forced, with the planet carrier 9 solidly braked, to adopt rotational speeds which are related to one another in the ratio fixed by their numbers of teeth.

Figures 1, 2A:
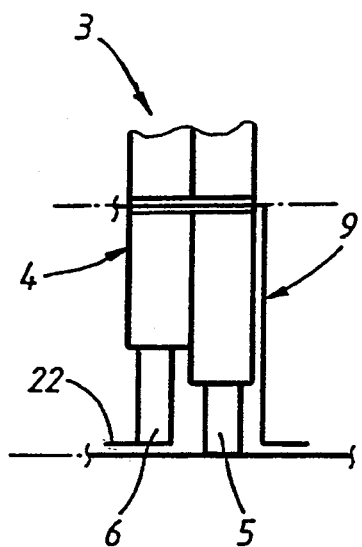
Figures 2, 2A:
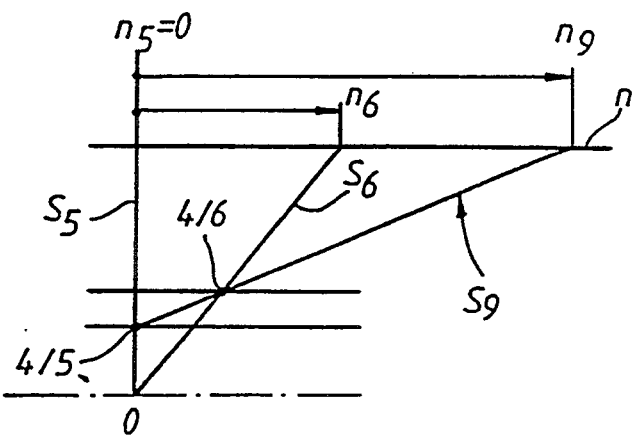
FIG. 2a is a Kutzbach-type rotational speed diagram for the loading case on the epicyclic gear for which slip occurs on the front axle and, in addition, one central wheel having the larger number of teeth spins relative to another central wheel having the smaller number of teeth.

In the loading case for the epicyclic gear 3 of FIG. 2, as shown in FIG. 2a, it is assumed that slip occurs at the front axle because of inadequate ground adhesion of the front wheels so that the central wheel 6 having the larger number of teeth is driven via the hollow shaft 22 to a higher speed relative to the other central wheel 5. The rotational speed $n_5$ on the rotational speed straight line n is then made equal to zero in the rotational speed diagram and a speed spoke $S_6$ is specified, for the central wheel 6, which determines the associated rotational speed value $n_6$ on the rotational speed straight line n. The geometrical locations 4/5 and 4/6 on the speed spokes $S_5$ and $S_6$ of the central wheels 5 and 6 for the speed spoke $S_9$ of the planet carrier 9 are determined, in known manner, by the points of rolling contact of these wheels on the planet wheel 4. The rotational speed value $n_9$ associated with the speed spoke $S_9$ on the rotational speed straight line n makes it apparent that the planet carrier 9 rotates approximately twice as fast as the central wheel 6, as is confirmed by the following control calculation:

$$n_9 = \frac{1}{\frac{Z_6 \cdot Z_{4/5}}{Z_5 \cdot Z_{4/6}} - 1} \left( \frac{Z_6 \cdot Z_{4/5}}{Z_5 \cdot Z_{4/6}} n_6 - n_5 \right)$$

EXAMPLE 1

$n_5 = 0 \quad n_6 = 3 \quad z_{4/6} = 4 \quad z_{4/5} = 5 \quad z_6 = 3 \quad z_5 = 2$ $$n_9 = \frac{1}{\frac{3 \cdot 5}{2 \cdot 4} - 1} \left( \frac{3 \cdot 5}{2 \cdot 4} \cdot 3 - 0 \right)$$

$n_9 = 6.43$

Figures 1, 2B:
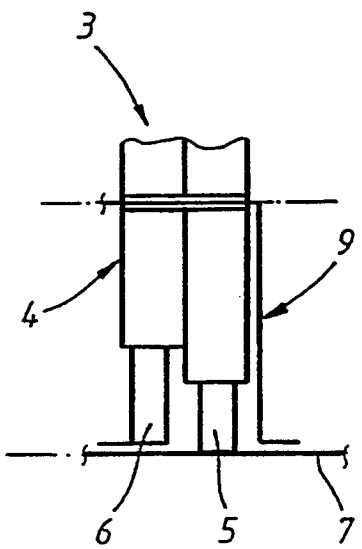
Figures 2, 2B:
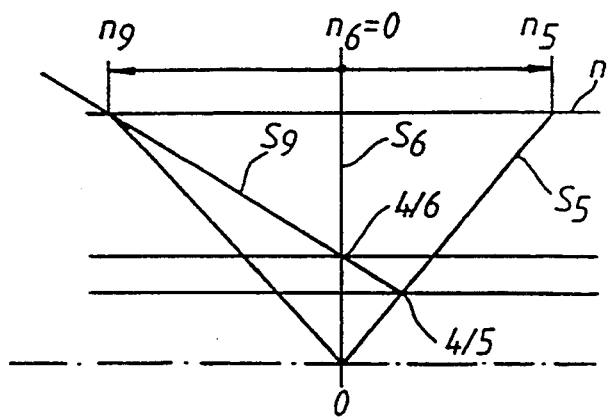
FIG. 2b is a Kutzbach-type rotational speed diagram for the loading case on the epicyclic gear for which slip occurs on the rear axle and, in addition, the other central wheel having the smaller number of teeth spins relative to the one central wheel having the larger number of teeth.

In the load case for the epicyclic gear 3 of FIG. 2, as shown in FIG. 2b, it is assumed that slip occurs at the rear axle because of inadequate ground adhesion of the rear wheels so that the central wheel 5 having the smaller number of teeth is driven via the output shaft 7 to a higher speed relative to the other central wheel 6. The rotational speed $n_6$ is then made equal to zero on the rotational speed straight line n in the rotational speed diagram and a speed spoke $S_5$ is specified, for the central wheel 5, which determines the associated rotational speed value $n_5$ on the rotational speed straight line n. The geometrical locations 4/5 and 4/6 on the speed spokes $S_5$ and $S_6$ for the speed spoke $S_9$ of the planet carrier 9 are again determined by the points of rolling contact of the central wheels 5 and 6 on the planet wheel 4. The rotational speed value $n_9$ marked on the rotational speed straight line n by the speed spoke $S_9$ makes it apparent that in this loading case, the planet carrier 9 rotates in the opposite direction to the central wheel 5 but again more rapidly, as is confirmed by the following control calculation:

$$n_9 = \frac{1}{\frac{Z_6 \cdot Z_{4/5}}{Z_5 \cdot Z_{4/6}} - 1} \left( \frac{Z_6 \cdot Z_{4/5}}{Z_5 \cdot Z_{4/6}} n_6 - n_5 \right)$$

EXAMPLE 2

$n_6 = 0 \quad n_5 = 3 \quad z_{4/6} = 4 \quad z_{4/5} = 5 \quad z_6 = 3 \quad z_5 = 2$ $$n_9 = \frac{1}{\frac{3 \cdot 5}{2 \cdot 4} - 1} (-3) = -3.43$$

In contrast to the representation in FIGS. 1 and 2, $Z_{4/5}$ is selected as not being equal to $Z_{4/6}$ in the above calculation examples.

If $Z_{4/5} = Z_{4/6} = Z_4$, the present invention is achieved in an advantageous manner. Specific numerical examples are given below with real numbers of teeth and rotational speeds.

Case A and B: Vehicle at rest; front axle (VA) and rear axle (HA) respectively slip at 30 km/h.

Case C and D: Vehicle moves at 100 km/h; HA and VA respectively retarded and run at only 70 km/h.

Case B corresponds to Example 1 discussed above and Case A corresponds to Example 2 discussed above.

The example where $Z_{4/5}$ is equivalent to $Z_{4/6}$ in accordance with FIGS. 1 and 2 shows that at a vehicle speed of 100 km/h, for example, and a brake slip of 30% on one of the axles, the critical rotational speed of, for example, 10,000 rpm is reached, at which the centrifugal brake must come into action.

Exchanging $Z_5$ for $Z_6$ leads to an exchange of the rotational speed $n_9$ in Case A with Case B and Case C with Case D.

Four examples each with
$Z_5 = 30$ (3 stepped planets)
$Z_6 = 33$
$Z_{4/5} = 21$
$Z_{4/6} = 18$

| | | Wheel speeds | | | |
|---|---|---|---|---|---|
| Case | $V_{HA}$ [km/h] | $V_{VA}$ [km/h] → | $n_5$(rpm) | $n_6$(rpm) | $n_9$(rpm) |
| A | 30 | 0 | 750 | 0 | −2,647 |
| B | 0 | 30 | 0 | 750 | +3,397 |
| C | 100 | 70 | 2,500 | 1,750 | −897 |
| D | 70 | 100 | 1,750 | 2,500 | +5,147 |

| | $n_{9A}$ | $n_{9B}$ | $n_{9C}$ | $n_{9D}$ |
|---|---|---|---|---|
| If $Z_5 = 33$; it follows that $Z_6 = 30$ | +3,397 | −2,647 | +5,147 | −897 |
| If $Z_{4/5} = Z_{4/6} =$ e.g. 18 and $Z_5 = 30$; $Z_6 = 33$ | −7,500 | 8,250 | −5,750 | 10,000 |
| or $Z_5 = 33$; $Z_6 = 30$ | 8,250 | −7,500 | 10,000 | −5,750 |

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An epicyclic gearbox arrangement for driving two vehicle axles of a motor vehicle, comprising two inner central wheels with different numbers of teeth and engaging with a planet wheel are in permanent drive connection with a front vehicle axle and a rear vehicle axle, respectively, and a planet carrier of the planet wheel can be locked securely to be a gearbox housing via a centrifugal brake, wherein the planet carrier is operatively connected to one of the inner central wheels by a friction clutch controlled as a function of slip occurring at one wheel of one of the vehicle axles and, with an automatic lock preventer operatively connected with wheels of the front and rear axles having slip threshold values, the centrifugal brake is configured such that a response rotational speed of the centrifugal brake for locking the planet carrier is sufficiently higher than rotational speeds at which slip threshold values of the automatic lock preventer occur but sufficiently lower than a critical rotational speed range at which bursting of the epicyclic arrangement occurs to prevent excessive rotational speed of the planet carrier.

2. The arrangement according to claim 1, wherein one of the central wheels is connected to the friction clutch to rotate with an input shaft adapted to be driven by a drive engine.

3. The arrangement according to claim 2, wherein the input shaft is connected by an input bell housing both with the friction clutch and with a coaxial output shaft operatively associated with the one central wheel.

4. The arrangement according to claim 1, including an epicycle distribution gearbox for operatively connecting the two central wheels and an input shaft adapted to be driven by a drive engine to one another.

5. The arrangement according to claim 1, wherein the friction clutch is a plate clutch.

6. The arrangement according to claim 1, the torque control apparatus is an electromagnetic setting element.

7. The arrangement according to claim 1, wherein when the automatic lock preventer is present, the friction clutch is arranged to be disengaged when vehicle brakes are actuated.

8. A method used with an epicyclic gearbox arrangement for driving two vehicle axles of a motor vehicle, having two inner central wheels with different numbers of teeth engaging a planet wheel, comprising the steps of
controlling a planet carrier of a planet wheel through a clutch as a function of slip occurring at one wheel of a vehicle axle and,
providing that, with an automatic lock preventer, a response rotational speed of a centrifugal brake via which the planet carrier of the planet wheel to be a gearbox housing, with said two inner central wheels in permanent drive connection with one of the vehicle axles is sufficiently higher than rotational speeds at which slip threshold values of the automatic lock preventer occur to avoid suppression of the slip threshold values of the lock preventer and sufficiently lower than a critical rotational speed range at which bursting of the epicyclic gearbox arrangement occurs to prevent excessive rotational speed of the planet carrier.

* * * * *